(12) United States Patent
Hooda et al.

(10) Patent No.: US 11,924,119 B2
(45) Date of Patent: Mar. 5, 2024

(54) PROVIDING SWITCHPORT PROTECTED FUNCTIONALITY ACROSS ENTERPRISE ACCESS (FABRIC) NETWORKS

(71) Applicant: Cisco Technology, Inc., San Jose, CA (US)

(72) Inventors: Sanjay Kumar Hooda, Pleasanton, CA (US); Victor Manuel Moreno, Carlsbad, CA (US); Prakash C. Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 104 days.

(21) Appl. No.: 17/749,930

(22) Filed: May 20, 2022

(65) Prior Publication Data
US 2023/0379270 A1 Nov. 23, 2023

(51) Int. Cl.
| | |
|---|---|
| H04L 49/253 | (2022.01) |
| H04L 47/31 | (2022.01) |
| H04L 49/25 | (2022.01) |
| H04L 49/35 | (2022.01) |
| H04L 67/2885 | (2022.01) |

(52) U.S. Cl.
CPC ............ *H04L 49/252* (2013.01); *H04L 47/31* (2013.01); *H04L 67/2885* (2013.01)

(58) Field of Classification Search
None
See application file for complete search history.

(56) References Cited

U.S. PATENT DOCUMENTS

| | | | |
|---|---|---|---|
| 7,093,027 B1* | 8/2006 | Shabtay | H04L 43/0811 709/239 |
| 8,934,378 B1 | 1/2015 | Novick et al. | |
| 8,949,656 B1* | 2/2015 | Ninan | G06F 11/2005 714/4.11 |
| 9,276,877 B1 | 3/2016 | Chua et al. | |
| 2012/0106560 A1* | 5/2012 | Gumaste | H04L 12/56 370/401 |
| 2014/0119193 A1* | 5/2014 | Anand | H04L 47/125 370/237 |
| 2021/0036916 A1 | 2/2021 | Szigeti et al. | |
| 2022/0029915 A1 | 1/2022 | Moreno et al. | |
| 2022/0407802 A1* | 12/2022 | Xiao | H04L 45/34 |

FOREIGN PATENT DOCUMENTS

WO  WO2014207725 A1  12/2014

* cited by examiner

*Primary Examiner* — Duc T Duong
(74) *Attorney, Agent, or Firm* — Lee & Hayes P.C.

(57) ABSTRACT

Techniques and architecture are described that utilize switchport protected flags to provide switchport protected functionality across network devices, e.g., switches, routers, etc., in fabric networks. For example, a first port of a first network device of a fabric network receives a packet from a first host destined for a second host. The second host is onboarded to the fabric network via a second port of a second network device. It is determined (i) if a first protected flag associated with the first port of the first network device is set as true and (ii) if a second protected flag associated with the second host is set as true. Based at least in part on (i) the first protected flag associated with the first port being set as true and (ii) the second protected flag being set as true, the first network device drops the packet.

20 Claims, 4 Drawing Sheets

PROVIDING SWITCHPORT PROTECTED FUNCTIONALITY ACROSS ENTERPRISE ACCESS (FABRIC) NETWORKS

TECHNICAL FIELD

The present disclosure relates generally to providing switchport protected functionality across enterprise access (fabric) networks, and in particular to providing switchport protected functionality across network devices, e.g., switches, routers, etc., in enterprise fabric networks, e.g., subnets, using a switchport protected flag.

BACKGROUND

Enterprise access networks such as, for example, enterprise fabric networks, software defined (SD) access (SD-access) networks, SD networks, overlay networks, etc., (referred to herein as enterprise fabric networks or fabric networks) help in scaling of endpoints in current enterprise networks with an increasing number of wireless devices, e.g., mobile devices, Internet-of-Things devices (IoT), etc., as well as virtual endpoints (virtual machines (VMs)) within devices. In addition to connectivity, the enterprise fabric networks also provide on-demand monitoring and services, e.g., assurance, serviceability, security, etc., for all endpoints in the enterprise fabric network.

Some applications require that no traffic be forwarded at Layer 2 between ports of a network device, e.g., a switch. In traditional networks, this functionality may be provided by "switchport protected" on a switch. The switchport functionality prevents traffic, whether it is unicast traffic, broadcast traffic, or multicast traffic, to flow between ports within a network device when the switchport protected functionality is activated within the network device.

However, in fabric networks the fabric network may be viewed as consisting of hundreds of network devices, e.g., switches. These hundreds of switches generally behave or act like a single, very large switch to the users of the fabric network. Currently, it is not possible in such a situation to provide the switchport protected functionality across the entire fabric network of switches instead of just a single switch.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
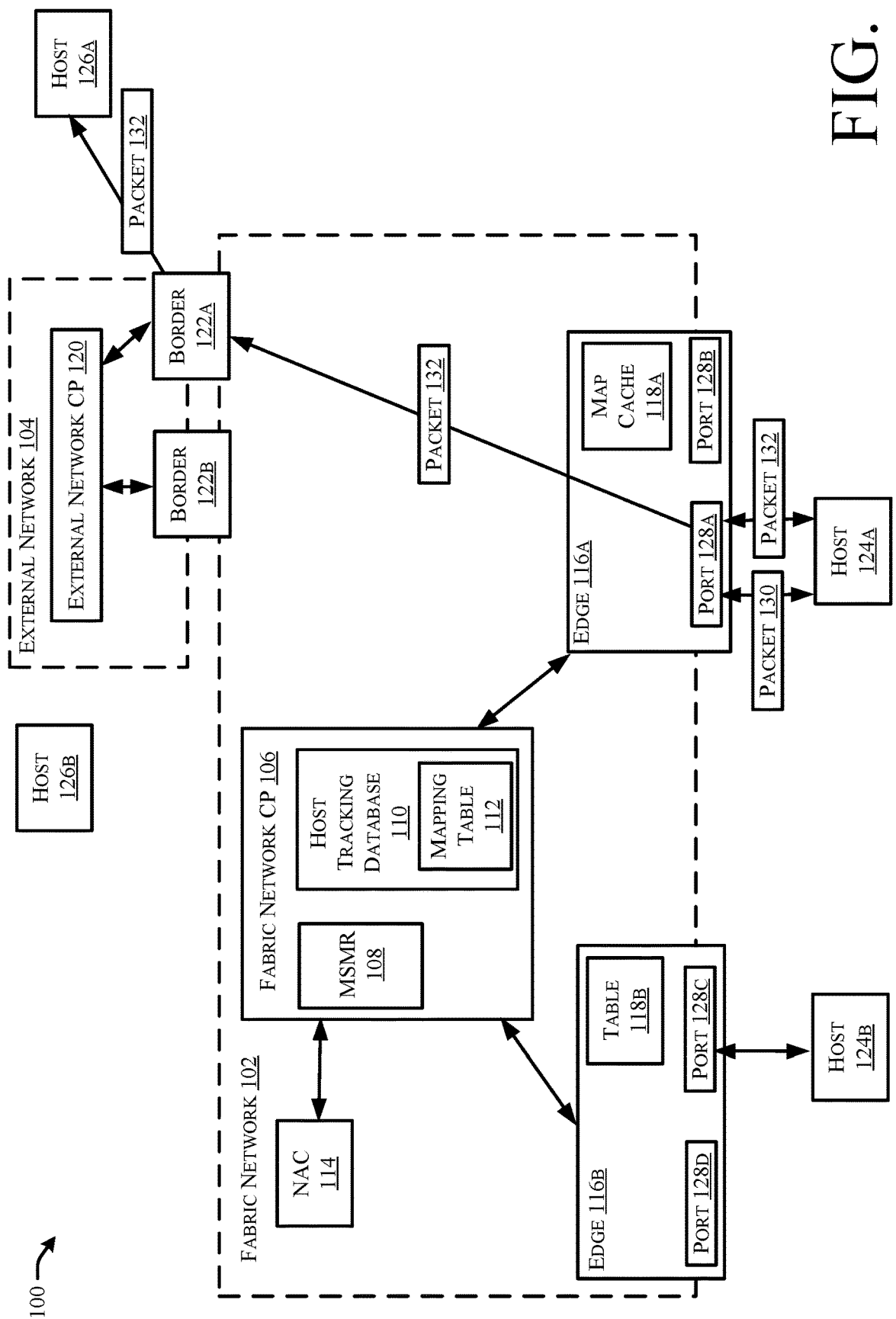
FIG. 1 schematically illustrates an example network arrangement of an enterprise access network in the form of a fabric network and an external access network.

The present disclosure describes techniques and architecture that utilize flags, e.g., switchport protected flags, to provide switchport protected functionality across network devices, e.g., switches, routers, etc., in enterprise fabric networks, e.g., subnets. The techniques and architecture extend, for example, locator/identifier separation protocol (LISP) (i) registration, (ii) map-reply messages and (iii) a media access control (MAC) address table. Thus, the techniques and architecture are described primarily from a SD-Access fabric perspective but the techniques and architecture equally apply to centralized, pull-based, on-demand protocols such as, for example, border gateway protocol ethernet virtual private network (BGP-EVPN).

In particular, the techniques and architecture extend a local map cache to have a "protected_flag=TRUE/FALSE" in the local map-cache. For example, a switch may include a local map cache that stores MAC addresses for hosts with an associated protected as either true (value=1) or false (value=0).

The techniques and architecture also update the local map cache of a switch with the protected flag upon learning an endpoint identifier (EID) (MAC address) of a host. For example, the local map cache may be updated with a host EID (MAC address) upon onboarding of the host with the switch or based upon a map-reply message from a map server/map resolver (MSMR) of the fabric network. The map-reply message from the MSMR may include the corresponding protected flag value as an EID attribute.

The techniques and architecture also update a fabric control plane of the fabric network with the EID (MAC address) along with the value of the protected flag value as an EID attribute. For example, the a host tracking or mapping table within the fabric control plane may be updated with a host EID (MAC address) upon onboarding of the host with the switch and registration of the host with the control plane.

The techniques and architecture also provide for sending a map-reply message with the value of the protected flag in, for example, LISP canonical address format (LCAF) in response to the source (SRC) fabric edge (switch) sending a map-request message for a host on a destination (DST) fabric edge (switch) for an EID (MAC) address. For example, when a source switch requests mapping or routing information for a destination host, the fabric control plane (e.g., the MSMR) may send a map-reply message that includes the value of the protected flag in LCAF to the source switch.

The techniques and architecture also provide for updating the local map cache of the source (SRC) fabric edge with the destination (DST) EID (MAC) address along with the protected flag. For example, the source switch may update its local map cache with the destination EID (MAC) address along with a corresponding protected flag value based upon a map-reply message from a map server/map resolver (MSMR) of the fabric network. The map-reply message from the MSMR may include the corresponding protected flag value as an EID attribute.

The techniques and architecture also provide for passing the destination (DST) EID (MAC) address along with the protected flag to the forwarding platform, which programs the them into the hardware. The techniques and architecture also provide for dropping or forwarding packets among fabric edges (switches) based on the source and destination protected values.

As an example, a method may include receiving, at a first port of a first network device of a fabric network comprising a plurality of network devices, a packet from a first host destined for a second host, wherein the second host is onboarded to the fabric network via a second port of a second network device. The method may also include determining if a first protected flag associated with the first port of the first network device is set as true. The method may further include determining if a second protected flag associated with the second host is set as true. The method may also include based at least in part on (i) the first protected flag associated with the first port of the first network device being set as true and (ii) the second protected flag associated with the second host being set as true, dropping, by the first network device, the packet.

In configurations, the method may further include based at least in part on at least one of (i) the first protected flag associated with the first port of the first network device being set as false or (ii) the second protected flag associated with the second host being set as false, forwarding, by the first network device, the packet to the second network device via the second port of the second network device.

In configurations, determining if the first protected flag associated with the first port of the first network device is set as true may comprise searching, by the first network device, a cache hosted by the first network device.

In configurations, the determining if the second protected flag associated with the second host is set as true may comprise searching, by the first network device, a cache hosted by the first network device.

In configurations, at least one of (i) the first protected flag associated with the first port of the first network device is associated with a media access control (MAC) address of the first network device or (ii) the second protected flag associated with the second host is associated with a MAC address of the second host.

In configurations, the method also includes during onboarding of the second host via the second port of the second network device, registering the second host with a map server with a status of the second protected flag and storing a media access control (MAC) address of the second host and the status of the second protected flag in a mapping table of the map server.

In configurations, the method further includes in response to receiving, at the first port of the first network device of the fabric network, the packet from the first host destined for the second host, sending, by the first network device, a map-request message to the map server and receiving, by the first network device from the map server, a map-reply message, wherein the map-reply message includes an attribute indicating a status of the second protected flag.

In configurations, the method also includes storing, by the first network device, the MAC address of the second host and the status of the second protected flag in a map cache of the first network device.

The techniques described herein may be performed by a system and/or device having non-transitory computer-readable media storing computer-executable instructions that, when executed by one or more processors, performs the method described above.

Example Embodiments

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example network arrangement 100 of an enterprise access network in the form of a fabric network 102 (also referred to herein as fabric 102), as well as an external access network 104, e.g., a cloud network, data center, software defined wide access network (SDWAN), etc. The external access network 104 may also be in the form of an extended access network that is in the form of a wireless extended access network or in the form of a wired extended access network, e.g., a layer two (L2) network. The external access network 104 may also be in the form of an internet-of-things (IoT) extended access network.

The fabric network 102 incudes a control plane 106 that includes a map server/map resolver (MSMR) 108, also referred to herein as a map server. The control plane 106 also includes a host tracking database 110, which includes a host tracking or mapping table 112 in the form of a layer-2 MAC address table. In configurations, the fabric network 102 may also include a network architecture controller (NAC) 114, e.g., Cisco® digital network architecture controller (DNAC), which, in configurations, may or may not be part of the fabric network control plane 106. The fabric network 102 also includes multiple edges 116 that are network devices, e.g., switches, routers, etc. Each edge 116 includes a map cache 118. In the example network arrangement 100, two edges 116a and 116b are illustrated, although, as is known, there may be fewer or more edges 114.

The external access network 104 includes a controller and/or a control plane 120 and multiple borders 122 in the form of network device, e.g., switches, routers, etc. In the example network arrangement 100, two borders 122a and 122b are illustrated, although, as is known, there may be fewer or more borders 122.

Endpoints, e.g., hosts 124, are included in the example network arrangement 100. The hosts 124 are "behind" the edges 116 and use the fabric network 102 to communicate and/or interact with each other. The hosts 124 also use the fabric network 102 to communicate with and/or interact with hosts 126 via the external access network 104. In the example network arrangement 100, there are two hosts 124a and 124b and two hosts 126a and 126b illustrated, although, as is known, there may be fewer or more hosts 124 and/or 126.

The edges 116 each include multiple ports 128. In the example network arrangement 100, the edge 116a includes two ports 128a and 128b, while the edge 116b includes two ports 128c and 128d. As is known, the edges 116 may include more than two ports 128.

In configurations, for example, host 124a may wish to communicate or interact with host 124b via the fabric network 102 when at least the first port 128a of the edge 116a and the first port 128c of the edge 116b are port protected. For the edges 116 to be port protected, the NAC 114 of the fabric network 102 configures the ports 128a, 128b of the edge 116a and the ports 128c, 128d of the edge 116b as protected ports. For example, at least the first port 128a of the edge 116a and the first port 116c of the edge 116b are each configured with a protected flag value set equal to one. In configurations, the protected flag values are associated with MAC addresses of the ports 128 of the edges 116. The NAC 114 may also configure the LISP with the protected port values for the first ports 128a, 128c. Thus, in this example configuration, the fabric network 102 is configured as a SD-access fabric network and thus, the NAC 114 is configured as a DNAC.

The host 124a is detected at port 128a of the edge 116a. Thus, the host 124a is onboarded onto the edge 124a. The first hop security (SISF) detects the MAC address of the host 124a on the protected port 128a of the edge 116a. Thus, the SISF informs LISP to register the host MAC address of the host 124a to the MSMR 108 of the fabric network control plane 106 with the associated protected flag value. In this example, the protected flag is set to a value of true, e.g., a value of one.

The edge 116a performs a map registration of the host MAC address of the host 124a with the protected flag value with the MSMR 108 of the fabric network control plane 106 with the associated protected flag value. The MSMR 108 stores the MAC address of the host 124a and the associated protected flag value. Thus, the protected flag value is associated with the MAC address of the host 124a. The host MAC address of the host 124a is coordinated in the mapping table 112 with edge 116a as the routing locator (RLOC) and the protected flag value as an EID attribute.

The host 124b is detected at port 128c of the edge 116b. Thus, the host 124b is onboarded onto the edge 116b. The SISF detects the MAC address of the host 124b on the protected port 128c of the edge 116b. Thus, the SISF informs LISP to register the host MAC address of the host 124b to the MSMR 108 of the fabric network control plane 106 with the associated protected flag value. In this example, the protected flag is set to a value of true, e.g., a value of one.

The edge 116b performs a map registration of the host MAC address of the host 124b with the protected flag value with the MSMR 108 of the fabric network control plane 106 with the associated protected flag value. The MSMR 108 stores the MAC address of the host 124b and the associated protected flag value. Thus, the protected flag value is associated with the MAC address of the host 124b. The host MAC address of the host 124b is coordinated in the mapping table 112 with edge 116b as the RLOC and the protected flag value as an EID attribute.

In the present example, the host 124a sends a packet 130 destined for the host 124b to the port 128a of the edge 116a. The edge 116a then sends a map-request message to the MSMR 108 to resolve the MAC address of the host 124b. The MSMR 108 determines the host MAC address for the host 124b as well as the value of the protected flag from the mapping table 112. The MSMR 108 then sends a map-reply message with the edge 116b as the RLOC and the protected flag value as an EID attribute. In this example, the protected flag value has a value of true, e.g., a value of one.

The edge 116a then creates a map cache entry in the map cache 118a for the MAC address of the host 124b with the protected flag value. The protected flag value is passed along to platform forwarding and programmed into the hardware.

Since in this example the port 128a of the edge 116a has a protected flag value of true, e.g., a value of one, and the map cache 118a entry for the MAC address of the host 124b has a protected value of true, e.g., a value of one, then the forwarding platform of the edge 116a drops the packet 130, e.g., does not forward the packet 130 from the host 124a to the edge 116b towards the host 124b. However, if either the port 128a of the edge 116a has a protected flag value of false, e.g., a value of zero, or the map cache 118a indicates that the MAC address of the host 124b has a protected flag value of false associated therewith, e.g., a value of zero, then the forwarding platform of the edge 116a may forward the packet 130 to the port 128c of the edge 116b, which may then forward the packet 130 on to the host 124b. However, as previously noted, in this example, both the protected flag of the port 116a of the edge 116a and the MAC address of the host 124 has a protected flag value of true, e.g., one, then the forwarding platform of the edge 116a may drop the packet 130.

Even though the port(s) 128 of the edges 116 of the fabric network 102 are port protected, the hosts 124 may communicate and/or interact with the host 126 of the external network 104 via the borders 122. For example, the host 124a may forward a packet 132 destined for host 126a to the port 128a of the edge 116a. The edge 116a may forward the packet 132 to the border 122a, which may then forward the packet 132 to the host 126a even though port 128a is protected.

Figure 2:
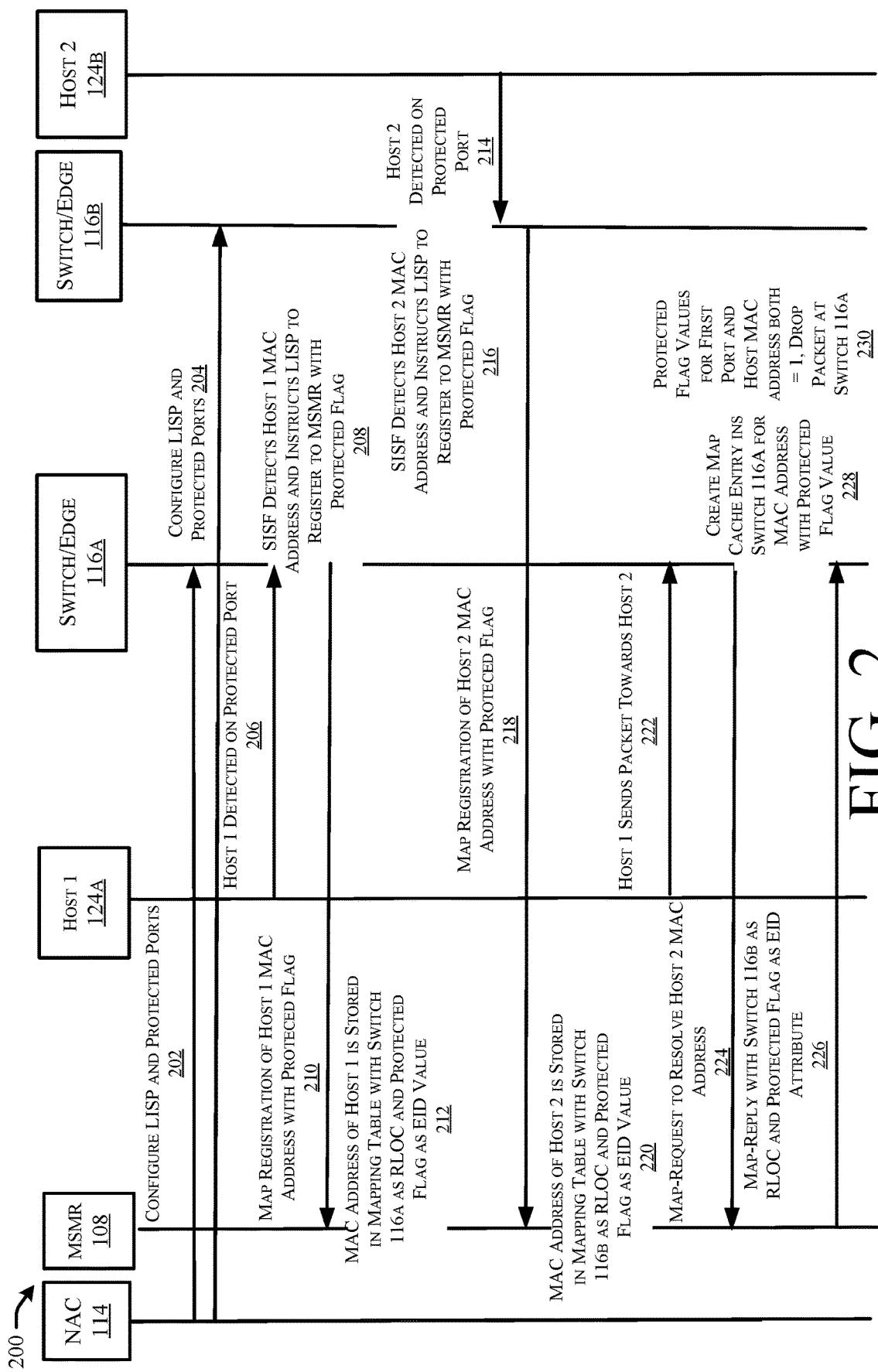
FIG. 2 illustrates an example flow for providing fabric network switchport protected functionality in the fabric network of FIG. 1.

FIG. 2 illustrates an example flow 200 for providing fabric network switchport protected functionality. The functionality is provided based on a protected flag value located at network devices, e.g., edges in the form of switches, routers, etc., of the fabric network, e.g., fabric network 102.

At 202, a controller of the fabric network configures ports (at least a first port) of a first switch as a protected port. For example, the NAC 114 of the fabric network 102 configures the port 128a of the edge 116a with a protected flag value set equal to true, e.g., a value of one. The NAC 114 may also configure the LISP with the protected port value for the first port 128a. Thus, in this example configuration, the fabric network 102 is configured as a SD-access fabric network and thus, the NAC 114 is configured as a DNAC.

At 204, controller of the fabric network configures ports (at least a first port) of a second switch as a protected port. For example, the NAC 114 of the fabric network 102 configures the port 128c of the edge 116b with a protected flag value set equal to true, e.g., a value of one. The NAC 114 may also configure the LISP with the protected port value for the first port 128a.

At 206, a first host is detected at the first port of the first switch. Thus, the first host is onboarded onto the first switch. For example, the host 124a is detected at port 128a of the edge 116a. Thus, the host 124a is onboarded onto the edge 124a.

At 208, the first hop security (SISF) detects the MAC address of the first host on the protected port of the first switch and informs LISP to register the host MAC address of the first host to the MSMR with the associated protected flag value. For example, the SISF detects the MAC address of the host 124a on the protected port 128a of the edge 116a. Thus, the SISF informs LISP to register the host MAC address of the host 124a to the MSMR 108 of the fabric network control plane 106 with the associated protected flag value. In this example, the protected flag is set to a value of true, e.g., a value of one.

At 210, the first switch performs a map registration of the host MAC address of the first host with the protected flag. For example, the edge 116a performs a map registration of the host MAC address of the host 124a with the protected flag value with the MSMR 108 of the fabric network control plane 106 with the associated protected flag value.

At 212, the host MAC address of the first host is stored in the mapping table with the first switch as the RLOC and the protected flag value as an EID attribute. For example, the MSMR 108 stores the MAC address of the host 124a and the associated protected flag value in the mapping table 112. Thus, the protected flag value is associated with the MAC address of the host 124a. The host MAC address of the host 124a is coordinated in the mapping table 112 with edge 116a as the RLOC and the protected flag value as an EID attribute.

At 214, a second host is detected at the first port of the second switch. Thus, the second host is onboarded onto the second switch. For example, the host 124b is detected at port 128c of the edge 116b. Thus, the host 124b is onboarded onto the edge 124b.

At 216, the SISF detects the MAC address of the second host on the protected port of the first switch of the second switch and informs LISP to register the host MAC address of the second host to the MSMR with the associated protected flag value. For example, the SISF detects the MAC address of the host 124b on the protected port 128c of the edge 116b. Thus, the SISF informs LISP to register the host MAC address of the host 124b to the MSMR 108 of the fabric network control plane 106 with the associated protected flag value. In this example, the protected flag is set to a value of true, e.g., a value of one.

At 218, the first switch performs a map registration of the host MAC address of the second host with the protected flag. For example, the edge 116b performs a map registration of the host MAC address of the host 124b with the protected flag value with the MSMR 108 of the fabric network control plane 106 with the associated protected flag value.

At 220, the host MAC address of the second host is stored in the mapping table with the second switch as the RLOC and the protected flag value as an EID attribute. For example, the MSMR 108 stores the MAC address of the host 124b and the associated protected flag value in the mapping table 112. Thus, the protected flag value is associated with the MAC address of the host 124b. The host MAC address of the host 124b is coordinated in the mapping table 112 with edge 116b as the RLOC and the protected flag value as an EID attribute.

At 222, the first host sends a packet destined for the second host. For example, the host 124a sends a packet 130 destined for the host 124b to the port 128a of the edge 116a.

At 224, the first switch sends a map-request message to the MSMR. For example, the edge 116a sends a map-request message to the MSMR 108 to resolve the MAC address of the host 124b.

At 226, the MSMR sends a map-reply message to the first switch with the first switch as the RLOC and the protected flag value as an EID attribute. For example, the MSMR 108 determines the host MAC address for the host 124b as well as the value of the protected flag from the mapping table 112. The MSMR 108 then sends a map-reply message with the edge 116b as the RLOC and the protected flag value as an EID attribute. In this example, the protected flag value has a value of true, e.g., a value of one.

At 228, the first switch creates a map cache entry for the MAC address of the second host with the protected flag value. The protected flag value is passed along to platform forwarding and programmed into the hardware. For example, the edge 116a creates a map cache entry in map cache 118a for the MAC address of the host 124b with the protected flag value. The protected flag value is passed along to platform forwarding and programmed into the hardware.

At 230, since in this example the first port of the first switch has a protected flag value of true, e.g., a value of one, and the map cache for the MAC address of the second host has a protected value of true, e.g., a value of one, then the forwarding platform of the first switch drops the packet, e.g., does not forward the packet from the first host to the first switch towards the second host. For example, since the port 128a of the edge 116a has a protected flag value of true, e.g., a value of one, and the map cache 118a entry for the MAC address of the host 124b has a protected value of true, e.g., a value of one, then the forwarding platform of the edge 116a drops the packet, e.g., does not forward the packet from the host 124a to the edge 116b towards the host 124b.

However, if either the first port of the first switch has a protected flag value of false, e.g., a value of zero, or the map cache indicates that the MAC address of the second host has a protected flag value of false associated therewith, e.g., a value of zero, then the forwarding platform of the first switch may forward the packet to the first port of the second switch, which may then forward the packet on to the second host. For example, if either the port 128a of the edge 116a has a protected flag value of false, e.g., a value of zero, or the map cache 118a indicates that the MAC address of the host 124b has a protected flag value of false associated therewith, e.g., a value of zero, then the forwarding platform of the edge 116a may forward the packet to the port 128c of the edge 116b, which may then forward the packet on to the host 124b. However, as previously noted, in this example, both the protected flag of the port 116a of the edge 116a and the MAC address of the host 124 has a protected flag value of true, e.g., one, then the forwarding platform of the edge 116a may drop the packet.

Thus, in the example of FIG. 2, the first host (e.g., host 124a) serves as a source host and the second host (e.g., host 124b) serves as a destination host. The first switch (e.g., edge 116a) serves as an ingress tunnel router (ITR) and the second switch (e.g., edge 116b) serves as an egress tunnel router (ETR), but essentially using the techniques and architecture described herein, the first and second switch act as a single switch. Additionally, when the direction of traffic is reversed, i.e., the second host wishes to communicate with the first host the flow and functions of the components in FIG. 2 would operate in a similar manner but the second host (e.g., host 124b) would serve as a source host and the first host (e.g., host 124a) would serve as a destination host, while the second switch (e.g., edge 116b) would serve as an ITR and the first switch (e.g., edge 116ab) would serve as an ETR.

While the examples described with respect to FIGS. 1 and 2 have been described with respect to a fabric network configured as an SD-access fabric network, e.g., a LISP-based fabric network, the techniques and architecture described herein may be applied to any fabric network technology, e.g., a centralized, pull-based, on-demand protocol configured fabric network. For example, the techniques and architecture may be applied to provide switch port protection for fabric networks configured via BGP-EVPN protocol. For example, to provide switchport protected functionality, in a first step, an extended community within BGP-EVPN fabric network may be reserved for a protected flag value. The protected flag value may have a value of either true (e.g., a value of one) or false (e.g., a value of zero). When a host is connected to the EID (MAC), it is learned on the fabric network. If the switch port protection is configured, e.g., the port to which the host is connected has a protected flag value of true (e.g., a value of one), then the extended community for the MAC address of the host is set to true, e.g., a value of one (in the type-2 route).

Other leafs within the fabric network receive the type-2 route and by inspecting the extended community, switches know that the remote host is connected on a protected port. The destination EID (MAC) and the protected flag are passed to the forwarding platform, which programs it in the hardware of the switch. Based on the source and destination protected flag value, the packet is dropped or allowed normal processing. Thus, as one can see, once the information regarding the protected port is received at the fabric edge or leaf, the platform portion of how to implement the protected port functionality is generally the same as previously described with respect to the LISP protocol SD-access fabric network examples described herein.

For application centric infrastructure (ACI), a similar extension applies for the MAC routes, i.e., the protected flag needs to be carried in the council of Oracle® protocol (COOP) protocol along with the MAC address so that other leaves know whether the host is connected to a protected port or not.

Figure 3:
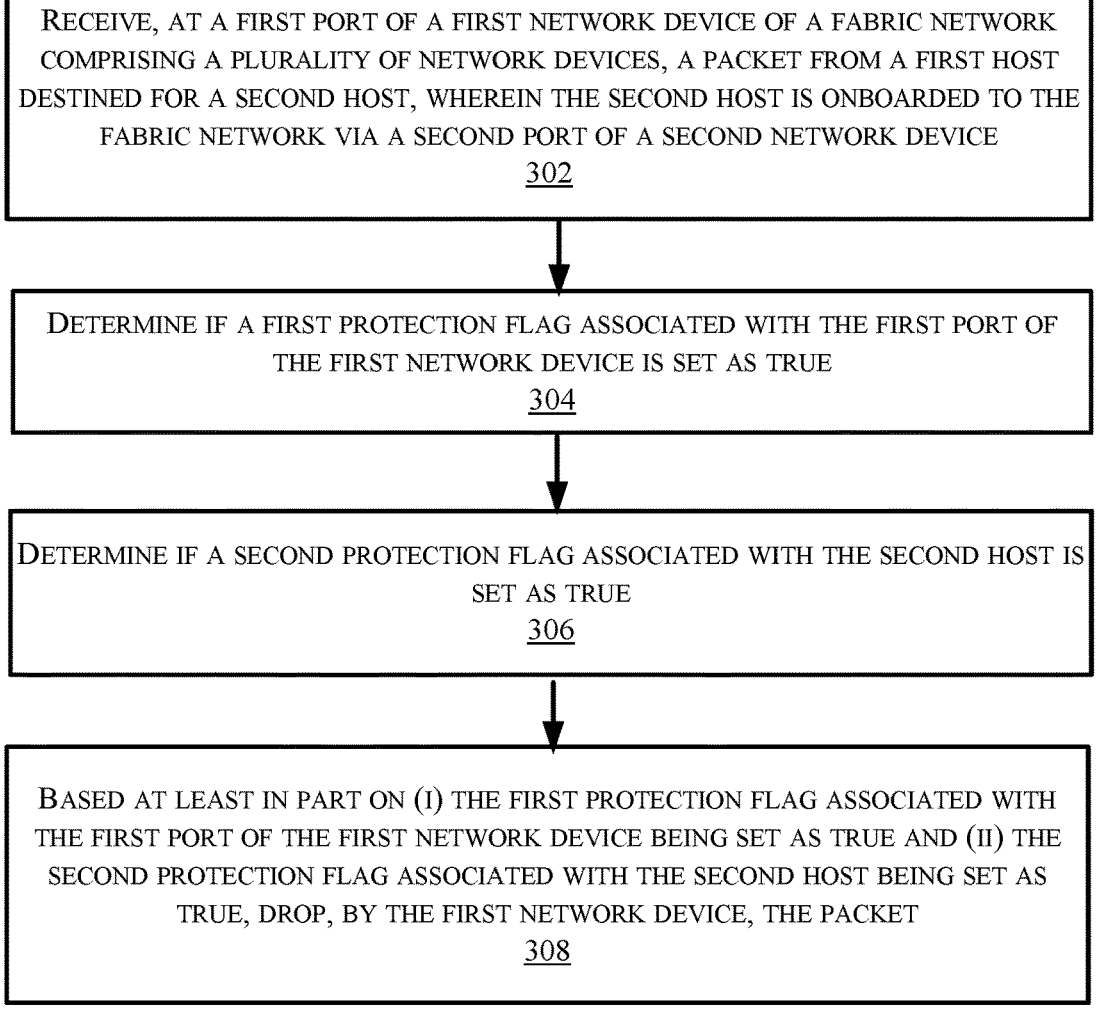
FIG. 3 illustrates a flow diagram of an example method for providing fabric network switchport protected functionality in the fabric network of FIG. 1.

FIG. 3 illustrates a flow diagram of an example method 300 and illustrates aspects of the functions performed at least partly by network devices of a network as described with respect to FIGS. 1 and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for providing fabric network switchport protected functionality. The functionality is provided based on a protected flag value located at network devices, e.g., edges in the form of switches, routers, etc., of the fabric network, e.g., fabric network 102. In some examples, the method 300 may be performed by a system comprising one or more processors and one or more non-transitory computer-readable media storing computer-executable instructions that, when executed by the one or more processors, cause the one or more processors to perform the method 300.

At 302, a first port of a first network device of a fabric network comprising a plurality of network devices receives a packet from a first host destined for a second host, wherein the second host is onboarded to the fabric network via a second port of a second network device. For example, the host 124a may send a packet 130 destined for the host 124b to the port 128a of the edge 116a. The host 124b may detected at port 128c of the edge 116b. Thus, the host 124b may be onboarded on the edge 124b.

At 304, it may be determined if a first protected flag associated with the first port of the first network device is set as true. For example, the edge 116a may determine if port 128a has a protected flag value equal to true, e.g., equal to one.

At 306, it may be determined if a second protected flag associated with the second host is set as true. For example, the edge 116a may determine if the host 124b has a protected flag value equal to true, e.g., equal to one. In configurations, the protected flag value may be associated with a MAC address of the host 124b. The protected flag value may be an EID attribute stored in map cache 118a with the MAC address for the host 124b.

At 308, based at least in part on (i) the first protected flag associated with the first port of the first network device being set as true and (ii) the second protected flag associated with the second host being set as true, dropping, by the first network device, the packet. For example, since the port 128a of the edge 116a has a protected flag value of true, e.g., a value of one, and the map cache 118a entry for the MAC address of the host 124b has a protected value of true, e.g., a value of one, then the forwarding platform of the edge 116a drops the packet, e.g., does not forward the packet from the host 124a to the edge 116b towards the host 124b. However, as previously noted, if either the port 128a of the edge 116a has a protected flag value of false, e.g., a value of zero, or the map cache 118a indicates that the MAC address of the host 124b has a protected flag value of false associated therewith, e.g., a value of zero, then the forwarding platform of the edge 116a may forward the packet to the port 128c of the edge 116b, which may then forward the packet on to the host 124b. However, as previously noted, in this example, both the protected flag of the port 116a of the edge 116a and the MAC address of the host 124 has a protected flag value of true, e.g., one, then the forwarding platform of the edge 116a may drop the packet.

Thus, the present disclosure provides techniques and architecture for extending switchport protection across an entire fabric network by introducing a protected flag in map cache, a layer-2 MAC table (e.g., mapping table 112) in the fabric control plane, map-register, map-request and map-reply messages such that communication across two layer-2 ports across the fabric network may be stopped. The techniques and architecture extend, for example, locator/identifier separation protocol (LISP) (i) registration, (ii) map-reply and (iii) a media access control (MAC) address table. Thus, the techniques and architecture have been described herein primarily from a SD-Access fabric perspective but the techniques and architecture equally apply to centralized, pull-based, on-demand protocols such as, for example, border gateway protocol ethernet virtual private network (BGP-EVPN).

Figure 4:
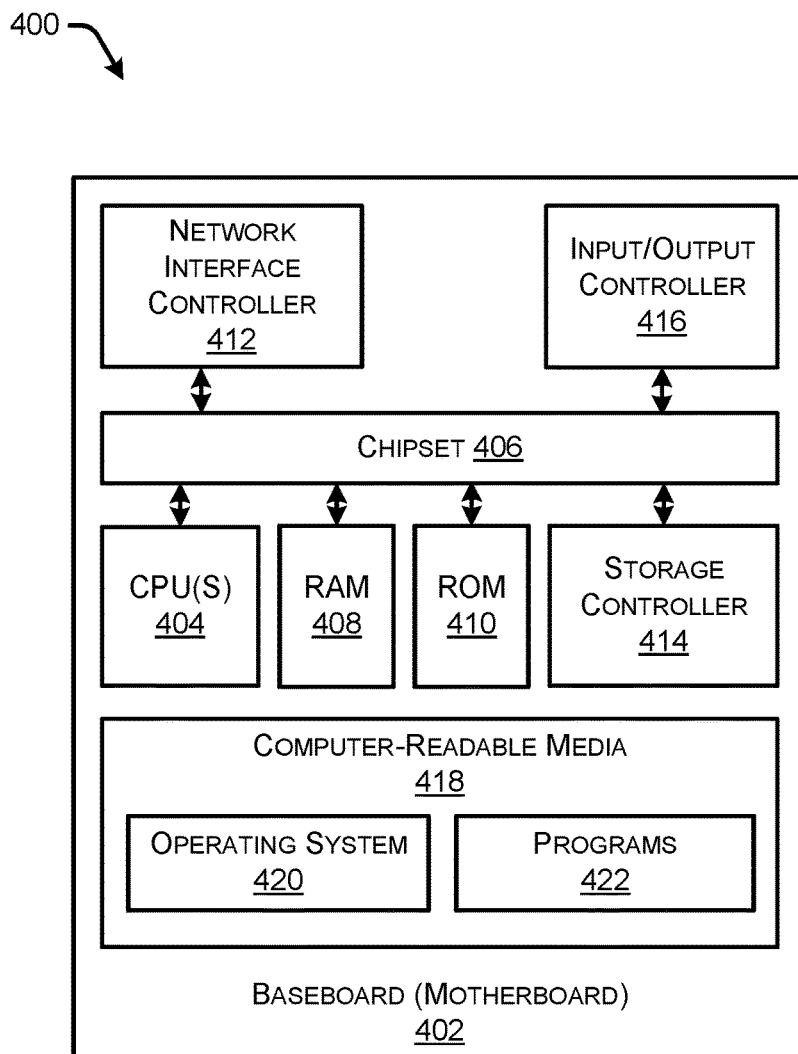
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over the networks of the arrangement 100. It should be appreciated that multiple NICs 412 can be present in the computing device 400, connecting the computer to other types of networks and remote computer systems.

The computing device 400 can be connected to a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a first port of a first network device of a fabric network comprising a plurality of network devices, a packet from a first host destined for a second host, wherein the second host is onboarded to the fabric network via a second port of a second network device;
determining if a first protected flag associated with the first port of the first network device is set as true;
determining if a second protected flag associated with the second host is set as true; and
based at least in part on (i) the first protected flag associated with the first port of the first network device being set as true and (ii) the second protected flag associated with the second host being set as true, dropping, by the first network device, the packet.

2. The method of claim 1, further comprising:
based at least in part on at least one of (i) the first protected flag associated with the first port of the first network device being set as false or (ii) the second protected flag associated with the second host being set as false, forwarding, by the first network device, the packet to the second network device via the second port of the second network device.

3. The method of claim 1, wherein determining if the first protected flag associated with the first port of the first network device is set as true comprises searching, by the first network device, a cache hosted by the first network device.

4. The method of claim 1, wherein determining if the second protected flag associated with the second host is set as true comprises searching, by the first network device, a cache hosted by the first network device.

5. The method of claim 1, wherein at least one of (i) the first protected flag associated with the first port of the first network device is associated with a media access control (MAC) address of the first network device or (ii) the second protected flag associated with the second host is associated with a MAC address of the second host.

6. The method of claim 1, further comprising:
during onboarding of the second host via the second port of the second network device, registering the second host with a map server with a status of the second protected flag; and
storing a media access control (MAC) address of the second host and the status of the second protected flag in a mapping table of the map server.

7. The method of claim 6, further comprising:
in response to receiving, at the first port of the first network device of the fabric network, the packet from the first host destined for the second host, sending, by the first network device, a map-request message to the map server; and
receiving, by the first network device from the map server, a map-reply message, wherein the map-reply message includes an attribute indicating a status of the second protected flag.

8. The method of claim 7, further comprising:
storing, by the first network device, the MAC address of the second host and the status of the second protected flag in a map cache of the first network device.

9. A system comprising:
one or more processors; and
one or more non-transitory computer-readable media storing computer-executable instructions that, when executed by the one or more processors, cause the one or more processors to perform actions comprising:
receiving, at a first port of a first network device of a fabric network comprising a plurality of network devices, a packet from a first host destined for a second host, wherein the second host is onboarded to the fabric network via a second port of a second network device;
determining if a first protected flag associated with the first port of the first network device is set as true;
determining if a second protected flag associated with the second host is set as true; and
based at least in part on (i) the first protected flag associated with the first port of the first network device being set as true and (ii) the second protected flag associated with the second host being set as true, dropping, by the first network device, the packet.

10. The system of claim 9, wherein the actions further comprise:
based at least in part on at least one of (i) the first protected flag associated with the first port of the first network device being set as false or (ii) the second protected flag associated with the second host being set as false, forwarding, by the first network device, the packet to the second network device via the second port of the second network device.

11. The system of claim 9, wherein determining if the first protected flag associated with the first port of the first network device is set as true comprises searching, by the first network device, a cache hosted by the first network device.

12. The system of claim 9, wherein determining if the second protected flag associated with the second host is set as true comprises searching, by the first network device, a cache hosted by the first network device.

13. The system of claim 9, wherein at least one of (i) the first protected flag associated with the first port of the first network device is associated with a media access control (MAC) address of the first network device or (ii) the second protected flag associated with the second host is associated with a MAC address of the second host.

14. The system of claim 9, wherein the actions further comprise:
during onboarding of the second host via the second port of the second network device, registering the second host with a map server with a status of the second protected flag; and
storing a media access control (MAC) address of the second host and the status of the second protected flag in a mapping table of the map server.

15. The system of claim 14, further comprising:
in response to receiving, at the first port of the first network device of the fabric network, the packet from the first host destined for the second host, sending, by the first network device, a map-request message to the map server; and
receiving, by the first network device from the map server, a map-reply message, wherein the map-reply message includes an attribute indicating a status of the second protected flag.

16. The system of claim 15, further comprising:
storing, by the first network device, the MAC address of the second host and the status of the second protected flag in a map cache of the first network device.

17. One or more non-transitory computer-readable media storing computer-executable instructions that, when executed by one or more processors, cause the one or more processors to perform actions comprising:
receiving, at a first port of a first network device of a fabric network comprising a plurality of network devices, a packet from a first host destined for a second host, wherein the second host is onboarded to the fabric network via a second port of a second network device;
determining if a first protected flag associated with the first port of the first network device is set as true;
determining if a second protected flag associated with the second host is set as true; and
based at least in part on (i) the first protected flag associated with the first port of the first network device being set as true and (ii) the second protected flag associated with the second host being set as true, dropping, by the first network device, the packet.

18. The one or more non-transitory computer-readable media storing computer-executable instructions of claim 17, wherein the actions further comprise:
based at least in part on at least one of (i) the first protected flag associated with the first port of the first network device being set as false or (ii) the second protected flag associated with the second host being set as false, forwarding, by the first network device, the packet to the second network device via the second port of the second network device.

19. The one or more non-transitory computer-readable media storing computer-executable instructions of claim 17, wherein:
determining if the first protected flag associated with the first port of the first network device is set as true comprises searching, by the first network device, a cache hosted by the first network device; and
determining if the second protected flag associated with the second host is set as true comprises searching, by the first network device, a cache hosted by the first network device.

20. The one or more non-transitory computer-readable media storing computer-executable instructions of claim 17, wherein at least one of (i) the first protected flag associated with the first port of the first network device is associated with a media access control (MAC) address of the first network device or (ii) the second protected flag associated with the second host is associated with a MAC address of the second host.

* * * * *